Aug. 20, 1929.   F. MEYER   1,724,953
METHOD OF AND DEVICE FOR TESTING BLOOD
Filed Oct. 31, 1927
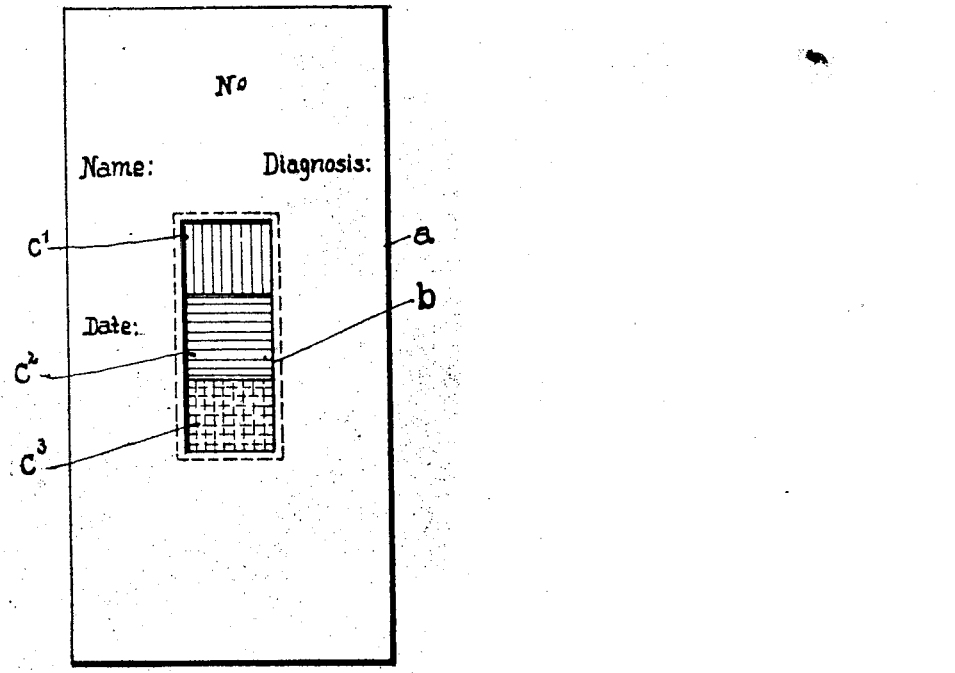
Inventor:
Fritz Meyer,
by
Attorney.

Patented Aug. 20, 1929.

1,724,953

UNITED STATES PATENT OFFICE.

FRITZ MEYER, OF HILDESHEIM, GERMANY.

METHOD OF AND DEVICE FOR TESTING BLOOD.

Application filed October 31, 1927, Serial No. 230,149, and in Germany November 13, 1926.

My invention relates to improvements in the method of and device for testing blood, and the object of the improvements is to provide a method by means of which certain diseases can be ascertained from changes of the blood caused by the said diseases, the said method being simple and reliable in use and enabling the physician to make the test without expensive apparatus and in his parlor or in the sick room, and to examine the test with the naked eye. With this object in view my invention consists in applying drops of the blood to be tested to differently colored strips of translucent and absorbent material, allowing the drops to be dried by the air, examining the images thus produced by means of light falling through the same, and comparing the said images with images made in a similar way by means of healthy blood.

In carrying out the method I prefer to use red and blue strips, and more particularly one red strip and two blue strips one being pure blue and the other one blue with a slight greenish shade.

By means of my improved method reaction images are produced on the strips which present material differences in form and different shades of color in the median parts of the cores of the drops.

For example, I use three test strips, one being dyed Pompeian red by means of Sudan red and a very small amount of malachite green, and the second and third ones being dyed respectively pure blue and blue with a weak greenish shade, by means of methylene blue, methylene-blue-eosin, and more or less cognac yellow. For example, for thus dyeing the test strips I use the following solutions of dyestuffs:

Red test strip: 100 parts of a 4% alcoholic solution of Sudan red and 0,25 parts of a 1% alcoholic solution of malachite green.

First blue test strip: 100 parts of absolute alcohol, 2 parts of a 2% alcoholic solution of methylene blue, and 7 parts of a 2% alcoholic solution of cognac yellow.

Second blue test strip: 100 parts of absolute alcohol, 2 parts of a 2% alcoholic solution of methylene blue, 3,5 parts of a 2% alcoholic solution of cognac yellow, and 0,25 parts of a 1% alcoholic solution of methylene-blue-eosin.

Sudan red is a naphthalin, namely the acid salt of azodinaphthylamine
$$C_{30}H_{21}N_3, HCl + H_2O$$
Malachite green is a rosaniline dye, namely the zinc double salt of the colorless leucobase of malachite-green
$$(C_{23}H_{26}N_2) = C_{23}H_{24}N_2 + Zn\ Cl_2 + H_2O$$
Methylene blue is also a rosaniline dye, namely a zinc double salt of the chloride of the free base
$$C_{16}H_{18}N_3S.Cl = C_{16}H_{18}N_3S\ Cl - Zn\ Cl_2$$
Methylene blue-eosin is a precipitate known as either eosin-acid methylene blue or methylene blue-eosin. The formula of this material is not known. It is prepared by mingling equal portions of 1% solutions of the two coloring materials methylene blue and eosin. It is soluble in alcohol.

Cognac yellow is a mixture of various non-poisonous aniline dyes and it is understood not to be a chemical combination. The ingredients and the method of mingling them are trade secrets and can not be ascertained, but the material can be had from a firm of Dr. C. Georgi, Leipzig, Germany, as a uniformly occurring dye.

Preferably the said strips are fixed to a piece of cardboard, as has been illustrated in the accompanying drawing showing the said piece of cardboard with the strips attached thereto in elevation.

In the said drawing the piece of cardboard has received the reference character $a$, the window made therein the character $b$, and the strips the characters $c^1$, $c^2$, $c^3$. As shown the strips are glued to the cardboard at their margins. The card $a$ may be provided with printed matter, for example for indicating the number of the card, the name of the patient, the date, and the result of the diagnosis.

If now to each of the strips $c^1$, $c^2$, $c^3$ a drop of blood of a healthy person is applied, and the drops are dried, the image appearing on the red strip presents a sharp dark circumferential ring surrounding the core of the drop, and in some cases there is a current red corona between the said ring and the core. On the blue strips the dried drops produce images in the form of dark brown-red disks having slightly confused margins, and very weak corona portions of reddish-brown color.

If, however, the blood of a person suffering from syphilis, severe tuberculosis, pernicious anæmia, or sepsis is applied to the test strips, all the reaction images produced on the red strip have a strawberry-red corona without a surrounding ring. On the blue strips different images are produced. In case of syphilis the strips display a homogeneous, dark brown-red disk which is sharply distinguished from the colors of the test strips. In case of severe tuberculosis, pernicious anæmia and sepsis a more or less broad yellowish-green corona appears on the blue strips, which corona is broad, fringed and irregular. In case of pernicious anæmia the said corona is very narrow and it is more sharply distinguished from the test strip. In case of sepsis a slightly fringed corona is weakly indicated.

The drops of blood should be dried in the air without applying artificial or natural heating.

The reaction images may be tested by causing day light or lamp light to pass through the same.

I claim:

1. The herein described method of testing blood, which consists in applying drops of the blood to be tested to absorbent translucent testing media of red and blue colors, allowing the said drops to dry, and examining the images thus produced by means of light passing through said media and images.

2. The herein described method of testing blood, which consists in applying drops of the blood to be tested to absorbent translucent testing media one of red color and two of different shades of blue colors, allowing the said drops to dry, and examining the images thus produced by means of light passing through said media and images.

3. The herein described method of testing blood, which consists in applying drops of the blood to be tested to absorbent translucent testing media of different colors, one of said media being dyed Pompeian red by means of Sudan red and malachite green and the other one by means of methylene blue and cognac yellow, allowing the said drops to dry, and examining the images thus produced by means of light passing through said media and images.

4. The herein described method of testing blood, which consists in applying drops of the blood to be tested to absorbent translucent media of different colors, one of said media being dyed Pompeian red by means of Sudan red and malachite green, another one by means of methylene blue and cognac yellow, and a third one by means of methylene-blue-eosin and cognac yellow, allowing the said drops to dry, and examining the images thus produced by means of light passing through said media and images.

5. The herein described method of testing blood, which consists in applying drops of the blood to be tested to three absorbent translucent testing media dyed respectively red, pure blue and greenish blue, allowing said drops to dry, and examining the images thus produced by means of light passing through said media and images.

6. An apparatus for testing blood, comprising a support having a window, and strips of absorbent translucent material extending across said window, one of said strips being dyed red by means of Sudan red and malachite green, another one blue by means of malachite blue and cognac yellow, and a third greenish blue by means of methylene-blue-eosin and cognac yellow.

7. An apparatus for testing blood, comprising a support having a window, and strips of absorbent translucent material extending across said window, one of said strips being dyed red and another being dyed blue.

8. An apparatus for testing blood, comprising a support having a window, and strips of absorbent translucent material extending across said window, one of said strips being dyed red, another being dyed blue, and another being dyed greenish-blue.

In testimony whereof I have affixed my signature.

FRITZ MEYER.